United States Patent
Owhadi et al.

(10) Patent No.: US 7,730,293 B2
(45) Date of Patent: Jun. 1, 2010

(54) HARD DISK DRIVE SELF-TEST SYSTEM AND METHOD

(75) Inventors: Eric Owhadi, Tomball, TX (US); Jennifer E. Rios, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 706 days.

(21) Appl. No.: 11/586,842

(22) Filed: Oct. 26, 2006

(65) Prior Publication Data

US 2008/0104387 A1    May 1, 2008

(51) Int. Cl.
*G06F 15/177*    (2006.01)
(52) U.S. Cl. ................ 713/2; 713/1; 713/100
(58) Field of Classification Search ........... 713/1, 713/2, 100
See application file for complete search history.

(56) References Cited

U.S. PATENT DOCUMENTS

| | | | | |
|---|---|---|---|---|
| 5,881,151 A * | 3/1999 | Yamamoto | ............ | 726/24 |
| 5,978,913 A * | 11/1999 | Broyles et al. | ............ | 713/2 |
| 6,401,208 B2 * | 6/2002 | Davis et al. | ............ | 713/193 |
| 6,591,362 B1 * | 7/2003 | Li | ............ | 713/1 |
| 6,980,381 B2 * | 12/2005 | Gray et al. | ............ | 360/31 |
| 7,107,493 B2 * | 9/2006 | Nguyen et al. | ............ | 714/42 |
| 7,243,043 B2 * | 7/2007 | Shin | ............ | 702/182 |
| 7,340,776 B2 * | 3/2008 | Zobel et al. | ............ | 726/24 |
| 7,447,888 B2 * | 11/2008 | Du et al. | ............ | 713/1 |
| 7,600,051 B2 * | 10/2009 | Clifton et al. | ............ | 710/6 |
| 2003/0037279 A1 * | 2/2003 | Laio | ............ | 714/6 |
| 2004/0181656 A1 | 9/2004 | Stern et al. | | |
| 2005/0154951 A1 | 7/2005 | Budiman et al. | | |

OTHER PUBLICATIONS

Small Form Factor Committee Specification Draft for Self-Monitoring, Analysis and Reporting Technology (S.M.A.R.T.), Compaq Computer Corporation et al. pp. 1-14, May 3, 1995.
SFF Committe for Specification for Self-Monitoring, Analysis and Reporting Technology (S.M.A.R.T.), SFF-8035i, Compaq Computer Corporation et al., pp. 1-24, Apr. 1, 1996.

* cited by examiner

Primary Examiner—Nitin C Patel

(57) ABSTRACT

A hard disk drive (HDD) self-test system comprises a basic input/output system (BIOS) configured to automatically invoke a self-test of an HDD based on a predetermined schedule.

20 Claims, 2 Drawing Sheets

HARD DISK DRIVE SELF-TEST SYSTEM AND METHOD

BACKGROUND

Hard disk drives generally comprise a self-test diagnostic routine built into the firmware of the hard disk drive. The industry standard Advanced Technology Attachment (ATA) specification describes two levels of diagnostic tests that the drive can execute: a short test and an extended test. The short test takes approximately two minutes to complete while the extended test takes approximately one minute for each gigabyte of drive space to complete (in most cases, at least forty-five minutes). Although quicker than the extended test, the short test only detects a drive failure in about 60 to 70 percent of cases while the extended test has an accuracy rate of approximately 95 percent. Thus, the extended test is generally preferred for its accuracy. However, at least because of the time it takes to complete, the extended test is not conducive to a variety of testing circumstances (e.g., when test results are needed in a short period of time, such as in a telephone- or web-based customer service support session). Further, an off-line read scan or attribute data collection process for a hard disk drive (e.g., pursuant to the Self-Monitoring, Analysis and Reporting Technology (S.M.A.R.T.) specification) is neither as accurate nor provides the level of information as the extended test.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

Figure 1:
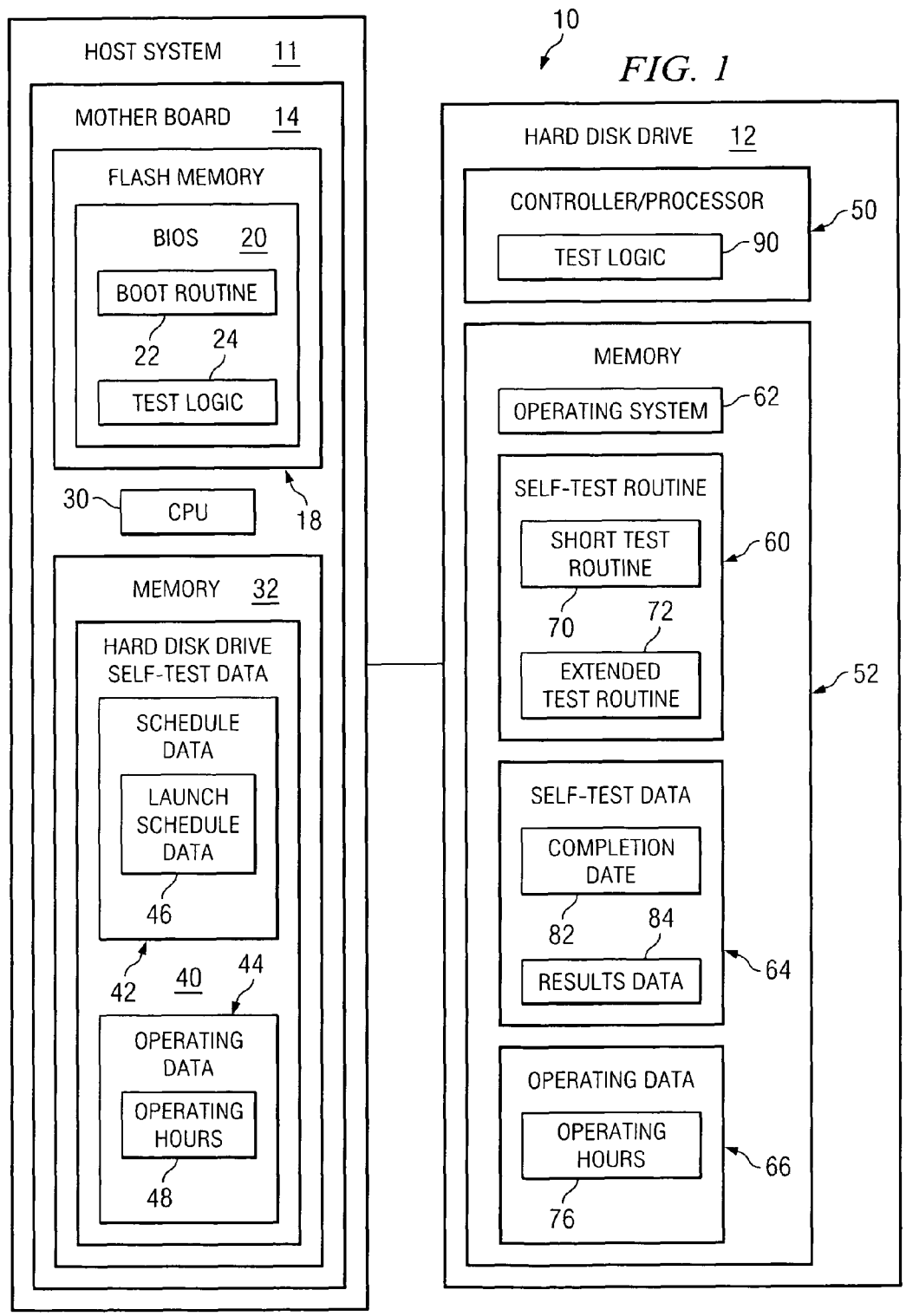
FIG. 1 is a diagram illustrating an embodiment of hard disk drive self-test system in accordance with the present invention.
Figure 2:
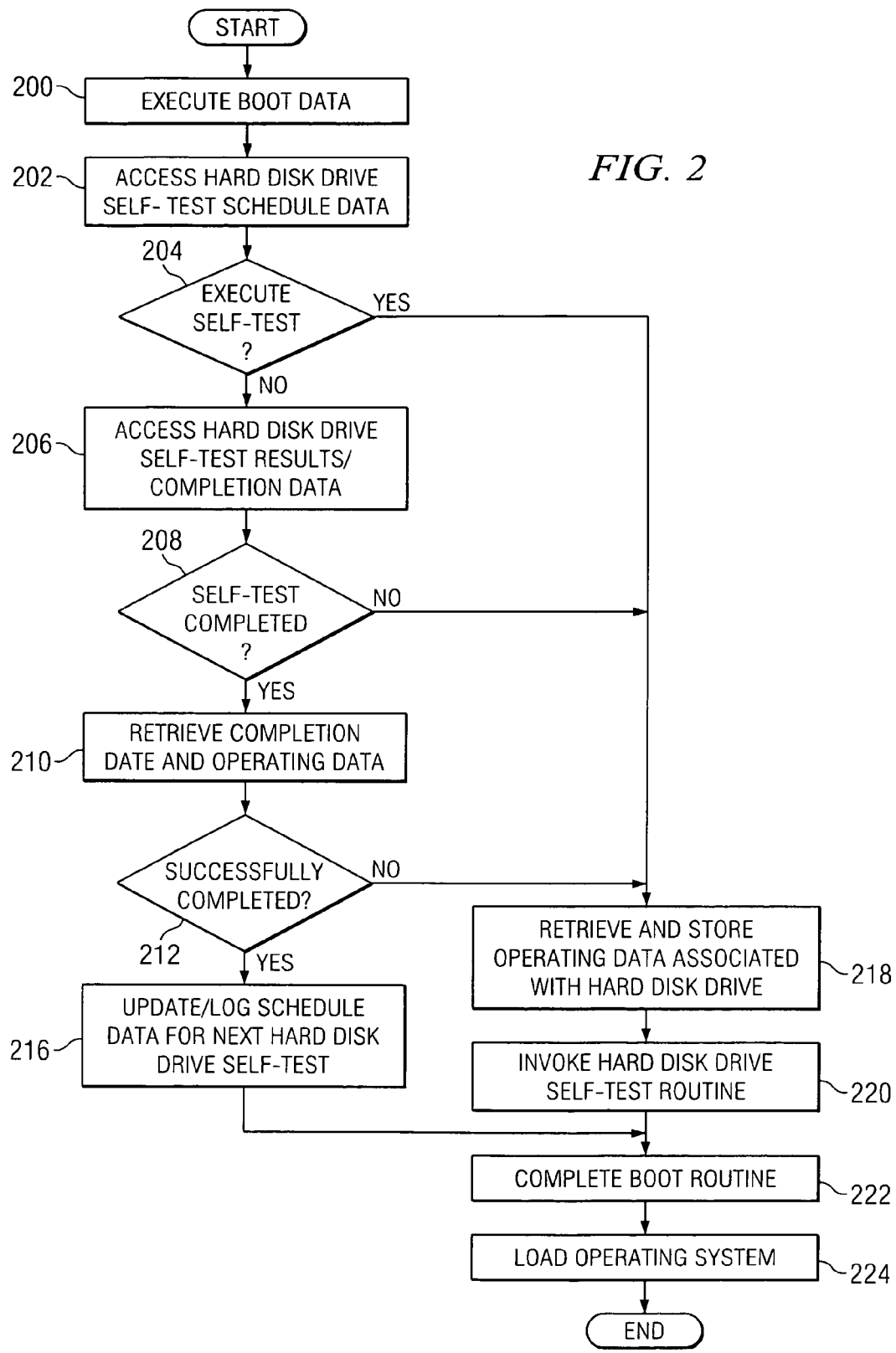
FIG. 2 is a flow diagram illustrating an embodiment of a hard disk drive self-test method in accordance with the present invention.

The preferred embodiments of the present invention and the advantages thereof are best understood by referring to FIGS. 1 and 2 of the drawings, like numerals being used for like and corresponding parts of the various drawings.

FIG. 1 is a diagram illustrating an embodiment of a hard disk drive (HDD) self-test system 10. In the embodiment illustrated in FIG. 1, a host system 11 is communicatively coupled to at least one HDD 12. Host system 11 may comprise any type of computing/processing device for communicating with, utilizing and/or otherwise accessing HDD 12 such as, but not limited to, a desktop computer, portable notebook computer, convertible portable computer, tablet computer, workstation or server. Further, it should be understood that HDD 12 may be incorporated within host system 11 (e.g., an internal HDD 12) or be a portable or external HDD 12 couplable to host system 11.

In the embodiment illustrated in FIG. 1, host system 11 comprises a motherboard 14 with a flash memory 18 having a basic input/output system (BIOS) 20 stored therein. BIOS 20 may comprise hardware, software, firmware, or a combination thereof. In the embodiment illustrated in FIG. 1, BIOS 20 comprise a boot routine 22 executable by a central processing unit (CPU) 30 of motherboard 14 for controlling booting operations upon startup or power-on of host system 11 such as a power-on self-test (POST) routine. It should be understood that boot routine 22 may also comprise instructions for saving and/or restoring state information of host system 11 in connection with a wake event associated with a hibernation, sleep or other type of reduced power and/or processing state of host system 11. Host system 11 also comprises a non-volatile memory 32 disposed on motherboard 14 and accessible by CPU 30. Memory 32 may comprise erasable programmable read-only memory (EPROM), non-volatile random access memory (NVRAM), or any other type of non-volatile memory component.

In the embodiment illustrated in FIG. 1, BIOS 20 also comprises test logic 24 for determining whether a self-test of HDD 12 should be performed and, if so, for invoking and/or otherwise causing execution of a self-test routine for HDD 12 (e.g., an extended test routine). Test logic 24 preferably comprises an ordered listing of executable instructions executable by CPU 30 or another processing element of host system 11. In FIG. 1, test logic 24 is illustrated as being stored in and/or otherwise forming part of BIOS 20; however, it should be understood that test logic 24 may be otherwise stored on host system 11 (e.g., in memory 32) and may be executable during booting operations of host system 11, executable after booting operations for host system 11 have been completed (e.g., after control of host system 11 has been transferred from BIOS 20 to an operating system such that test logic 24 runs as a background application), or executable at other times.

In FIG. 1, memory 32 comprises HDD self-test data 40 having information associated with a self-test of HDD 12. For example, in the embodiment illustrated in FIG. 1, HDD self-test data 40 comprises schedule data 42 and operating data 44. Schedule data 42 comprises information associated with a pre-determined schedule for invoking and/or otherwise causing a self-test of HDD 12, such as an extended self-test of HDD 12. For example, in FIG. 1, schedule data 42 comprises launch schedule data 46 having information associated with predetermined dates and/or time interval periods for invoking and/or otherwise causing a self-test of HDD 12. In some embodiments, launch schedule data 46 comprises a particular date or time period interval for automatically invoking or launching of a self-test of HDD 12 based on a successful completion of a previous self-test of HDD 12. In some embodiments, the predetermined self-test launch schedule for HDD 12 is preset at a manufacturing environment (e.g., according to a predetermined time interval or number of operating hours of HDD 12); however, it should be understood that launch schedule data 46 may be otherwise stored and/or modified (e.g., by a user or administrator of an electronic device in which system 10 is embodied).

Operating data 44 comprises information associated with operating parameters of HDD 12. For example, in the embodiment illustrated in FIG. 1, operating data 44 comprises operating hours 48 indicating a quantity of hours that HDD 12 has been operated. However, it should be understood that operating data 44 may comprise other types of information associated with different operating characteristics of HDD 12. Preferably, BIOS 20 is configured to retrieve information associated with operation of HDD 12 during each boot sequence so that such operational information is available to BIOS 20 during each subsequent boot sequence. Thus, it should be understood that during an initial boot routine 22 execution, such operational information of HDD 12 may not yet reside in memory 32.

In the embodiment illustrated in FIG. 1, HDD 12 comprises a controller/processor 50 and a non-volatile memory 52. In some embodiments, controller/processor 50 comprises hardware, software, firmware, or a combination thereof, for managing and/or otherwise controlling HDD 12 and for interpreting/processing requests received from host system 11. Non-volatile memory 52 may comprise disk memory or another type of memory component on HDD 12. In the embodiment illustrated in FIG. 1, memory 52 comprises a self-test routine 60, an operating system 62, self-test data 64 and operating data 66 stored thereon. Self-test routine 60 comprises a self-test diagnostic routine for HDD 12 (e.g., based on industry standard advanced technology attachment (ATA) specification) stored and/or otherwise embodied in software, hardware, firmware, or a combination thereof, executable by controller/processor 50 of HDD 12. In some embodiments, self-test routine 60 comprises a short-test routine 70 and an extended test routine 72. However, it should be understood that self-test routine 60 may comprise other types of self-test diagnostic routines. Preferably, self-test routine 60, operating system 62, self-test data 64 and operating data 66 are stored on disk memory of HDD 12. However, it should be understood that self-test routine 60, operating system 62, self-test data 64 and operating data 66 may be stored on other types of non-volatile memory components disposed on HDD 12.

Operating system 62 comprises any type of operating system for controlling and/or otherwise operating host system 11 (e.g., retrieved by host system 11 from HDD 12 and executed by CPU 30). Self-test data 64 comprises information associated with the operation, results and/or completion of a self-test of HDD 12 using self-test routine 60. For example, in the embodiment illustrated in FIG. 1, self-test data 64 comprises completion date 82 and results data 84 having information associated with the successful completion and/or results of a self-test of HDD 12. For example, completion date 82 indicates the hour of operation of HDD 12 when a completion of self-test routine 60 occurred, and results data 84 indicates the diagnostic test results of a self-test of HDD 12. Operating data 66 comprises information associated with operating parameters of HDD 12. For example, in the embodiment illustrated in FIG. 1, operating data 66 comprises operating hours 78 indicating the number of hours HDD 12 has been operated (from which completion date 82 may be obtained). However, it should be understood that operating data 66 may comprise other types of information associated with operating characteristics of HDD 12. Self-test data 64 and operating data 66 are preferably stored at a predetermined sector of disk memory of HDD 12. However, it should be understood that self-test data 64 and operating data 66 may be otherwise stored on HDD 12.

In some embodiments, controller/processor 50 comprises test logic 90 for determining whether a self-test of HDD 12 should be performed and, if so, for automatically invoking and/or otherwise causing execution of self-test routine 60 for HDD 12. Test logic 90 preferably comprises an ordered listing of executable instructions executable by controller/processor 50. In FIG. 1, test logic 90 is illustrated as being stored in and/or otherwise forming part of controller/processor 50; however, it should be understood that test logic 90 may be otherwise stored on HDD 12 (e.g., in memory 52). Preferably, test logic 90 is similar and/or identical to test logic 24 to facilitate a self-test of HDD 12 (e.g., if test logic 24 is not present on a particular host system 11). Thus, it should be understood that in some embodiments, if test logic 24 is present on host system 11, test logic 90 may be omitted from HDD 12, or if test logic 90 is present on HDD 12, then test logic 24 may be omitted from host system 11, or if test logic 24 and test logic 90 are present on host system 11 and HDD 12, respectively, test logic 24 and test logic 90 are preferably configured to cooperate with each other and/or otherwise work in conjunction with each other for automatically causing a self-test of HDD 12. For ease of description, the use and operation of only test logic 24 is described below; however, it should be understood that the operation(s) and/or function(s) of test logic 24 described below are also applicable to test logic 90.

In some embodiments, during execution of boot routine 22 (e.g., responsive to a power-on or wake event), test logic 24 is configured to cause BIOS 20 and/or CPU 30 to access HDD self-test data 40 to determine whether a self-test of HDD 12 is to be performed (e.g., an extended self-test using extended test routine 72). For example, test logic 24 causes BIOS 20 and/or CPU 30 to access and/or otherwise retrieve schedule data 42 to determine whether launch schedule data 46 indicates that a self-test of HDD 12 should be performed (e.g., if a current date matches a date indicated by launch schedule data 46). If schedule data 42 indicates that a self-test of HDD 12 should be performed, logic 24 causes BIOS 20 and/or CPU 30 to access operating data 66 of HDD 12 and retrieve information associated with operating hours 76 from HDD 12 and store such information as operating hours 48 in memory 32. Test logic 24 also invokes and/or otherwise causes execution of self-test routine 60 by HDD 12 (e.g., extended test routine 72). Thus, in operation, operating hours 48 indicates the current hour of operation of HDD 12 when the self-test of HDD 12 in initiated. In some embodiments, test logic 24 invokes and/or otherwise causes execution of extended self-test test routine 72 in a non-exclusive mode such that the extended self-test of HDD 12 is performed in the background while BIOS 20 executes, as required, any remaining operations of boot routine 22, loads operating system 62, and otherwise passes control of host system 11 to operating system 62. Thus, after invoking and/or otherwise causing execution of extended test routine 72 by HDD 12, BIOS 20 continues with any remaining procedures of boot routine 22 and loads operating system 62.

HDD 12 executes self-test routine 60 and stores information associated with the self-test in memory 52 as self-test data 64. Preferably, in response to completion of self-test routine 60, a date associated with completion of the self-test is stored as completion date 82 (e.g., the current hour of operation of HDD 12 when the self-test of HDD 12 ended), and the diagnostic test results of the self-test are stored as results data 84.

If schedule data 42 does not indicate that a self-test of HDD 12 is required, test logic 24 causes BIOS 20 and/or CPU 30 to access self-test data 64 to verify that a self-test of HDD 12 has been completed (e.g., a self-test previously completed based on a user request or completed as a result of test logic 24 automatically invoking a self-test of HDD 12 in response to a previous power-on or wake event). Thus, in operation, completion date 82 and/or results data 84 are used to determine whether an extended self-test routine 72 has been completed. If it is determined that an extended self-test routine 72 has been executed and completed, test logic 24 causes BIOS 20 and/or CPU 30 to access operating hours 48 stored in memory 32 and compare operating hours 48 with completion date 82. For example, completion date 82 should be greater than and/or otherwise reflect a date later than operating hours 48 if the self-test initiated at the date reflected by operating hours 48 was successfully completed. Thus, if completion date 82 is not greater than operating hours 48 (indicating that the self-test initiated at the time reflected by operating hours 48 was not completed), test logic 24 automatically re-invokes and/or otherwise causes execution of extended self-test test routine 72.

Further, in response to determining that a self-test of HDD 12 has been successfully completed, test logic 24 is configured to automatically schedule a next launch or execution of a self-test of HDD 12. For example, based on a pre-determined interval or estimated hours of operating time of HDD 12, test logic 24 is configured to automatically update or reset launch schedule data 46 for a next execution of a self-test of HDD 12 (e.g., a date ten days in the future from the date indicated by completion date 82). After updating or resetting launch schedule data 46, BIOS 20 continues any remaining functions associated with boot routine 22 and/or otherwise loads operating system 62.

In some embodiments, if during execution of boot routine 22 (e.g., in response to a power-on or wake event) it is determined that schedule data 42 does not indicate that a self-test of HDD 12 is required but that there is no indication of a completed self-test (e.g., based on a lack of results data 84 and/or completion date 82 associated with a self-test of HDD 12 occurring on or after a date indicated by launch schedule data 46), test logic 24 invokes and/or otherwise causes execution of extended self-test routine 72. For example, if host system 11 is turned off or placed into a hibernation, sleep/suspend or other reduced-power state such that a self-test is halted or otherwise interrupted before completion, test logic 24 is configured to automatically invoke a self-test of HDD 12 during a next boot sequence of host system 11 (e.g., during a subsequent power-on of the device or a subsequent a wake event from a hibernation, sleep/suspend or other reduced-power state).

FIG. 2 is a flow diagram illustrating an embodiment of an HDD self-test method. In FIG. 2, the method begins at block 200, where BIOS 20 executes boot routine 22 (e.g., in response to a power-on or wake event). At block 202, test logic 24 causes BIOS 20 and/or CPU 30 to access HDD self-test schedule data 42. At decision block 204, test logic 24 determines whether launch schedule data 46 indicates that a self-test of HDD 12 should be executed (e.g., if the current date matches a date indicated by launch schedule data 46). If a self-test of HDD 12 is not required, the method proceeds to block 206, where test logic 24 is used to access self-test data 64 of HDD 12. At decision block 208, test logic 24 is used to make a determination whether a self-test of HDD 12 has been completed. If a self-test of HDD 12 has been completed, the method proceeds to block 210.

At block 210, test logic 24 causes BIOS 20 and/or CPU 30 to access and/or otherwise retrieve completion date 82 from HDD 12 and operating hours 48 from memory 32. At decision block 212, test logic 24 is used to compare operating hours 48 to completion date 82 to determine whether any self-test initiated at the date reflected by operating hours 48 was successfully completed. If test logic 24 determines that completion date 82 is less than or reflects a date earlier than the date reflected by operating hours 48, the method proceeds to block 218. If test logic 24 determines that completion date 82 is greater than or reflects a date later than the date reflected by operating hours 48, the method proceeds to block 216, where test logic 24 causes schedule data 42 to be updated and/or otherwise reset for a next or subsequent self-test of HDD 12. The method then proceeds to block 222.

If at decision block 204 it is determined that launch schedule data 46 indicates that a self-test of HDD 12 is required, the method proceeds from decision block 204 to block 218, where test logic 24 causes BIOS 20 and/or CPU 30 to retrieve operating hours 76 information from HDD 12 and store as operating hours 48 information in memory 32. At block 220, test logic 24 invokes and/or otherwise causes execution of self-test extended test routine 72. It should be understood that upon completion of self-test extended test routine 72, HDD 12 stores information associated with the self-test in memory 52 as self-test data 64 (e.g., the results of the self-test as results data 84 and a date of completion of the self-test as completion date 82). At block 222, BIOS 20 completes any remaining functions associated with boot routine 22. At block 224, BIOS 20 loads operating system 62.

If at decision block 208 it is determined that a self-test of HDD 12 has not been completed (e.g., indicated by a lack of test results in memory 52 of HDD 12 and/or a completion date 82 indicating a completion of a self-test of HDD 12 corresponding to launch schedule data 46), the method proceeds from decision block 208 to block 218, where test logic 24 causes BIOS 20 and/or CPU 30 to store operating hours 76 information associated with HDD 12 in memory 32 and, at block 220, invokes and/or otherwise causes execution of a self-test of HDD 12.

Thus, embodiments of system 10 are used to automatically invoke a self-test of HDD 12 (preferably, an extended self-test of HDD 12) according to a predetermined schedule such that results of an extended self-test are readily available. Thus, for example, in response to telephone- and/or web-based customer support requests for information associated with a self-test of HDD 12, results of a self-test of HDD 12 are readily available without having to re-run a self-test of HDD 12 and wait for the results. It should be understood that test logic 90 may be used and/or executed in combination with BIOS 20 (in combination with or independently of test logic 24) or executed independently of BIOS 20 (e.g., executed by controller/processor 50) to automatically invoke a self-test of HDD 12 (preferably, an extended self-test of HDD 12) according to a predetermined schedule such that results of an extended self-test are readily available. It should be understood that in the described method, certain functions may be omitted, accomplished in a sequence different from that depicted in FIG. 2, or simultaneously performed. Also, it should be understood that the method depicted in FIG. 2 may be altered to encompass any of the other features or aspects as described elsewhere in the specification.

What is claimed is:

1. A hard disk drive (HDD) self-test system, comprising:
a first memory storage area to store a test schedule;
a second memory storage area to store a test completion date; and
a basic input/output system (BIOS) configured to automatically invoke a self-test of a hard disk drive in accordance with the test schedule when the test completion date is indicative of a successful completion of a prior self-test and to invoke the self-test of the hard disk drive without regard to the test schedule when the test completion date is not indicative of a successful completion of a prior self-test.

2. The system of claim 1, wherein the first memory storage area is in a first memory device and the second storage area is in a second memory device.

3. The system of claim 1, wherein the BIOS is configured to modify the test schedule based on completion of the self-test.

4. The system of claim 1, wherein the BIOS is configured to schedule a next self-test of the HDD in response to determining completion of the self-test of the hard disk drive.

5. The system of claim 1, further comprising a processor to execute a boot sequence of a host system corresponding to the BIOS during execution of the self-test of the hard disk drive.

6. The system of claim 1, wherein the BIOS is configured to pass control of a host system corresponding to the BIOS to an operating system during the self-test of the hard disk drive, and wherein the self-test of the hard disk drive continues during execution of the operating system.

7. The system of claim 1, wherein the BIOS is configured to determine whether the self-test of the hard disk drive has been completed in response to a wake event.

8. The system of claim 1, wherein the hard disk drive is to:
store diagnostic test results resulting from the self-test of the hard disk drive; and
facilitate access to the diagnostic test results during a customer support interaction.

9. The system of claim 1, further comprising a third memory space storing a short test routine of the hard disk drive and an extended test routine of the hard disk drive, wherein the self-test of the hard disk drive is the extended test routine.

10. A hard disk drive (HDD) self-test method, comprising:
retrieving a test schedule;
retrieving a test completion date;
invoking, by a basic input/output system (BIOS), a self-test of a hard disk drive in accordance with the test schedule when the test completion date is indicative of a successful completion of a prior self-test and to invoke the self-test of the hard disk drive without regard to the test schedule when the test completion date is not indicative of a successful completion of a prior self-test.

11. The method of claim 10, further comprising:
passing control of a host system corresponding to the BIOS to an operating system during the self-test of the hard disk drive; and
continuing the self-test of the hard disk drive during execution of the operating system.

12. The method of claim 10, further comprising modifying, by the BIOS, the test schedule based on completion of the self-test.

13. The method of claim 10, further comprising, from selection options of a short test routine and an extended test routine of the hard disk drive, selecting the extended test routine of the hard disk drive to perform the self-test of the hard disk drive.

14. The method of claim 10, further comprising scheduling, by the BIOS, a next self-test of the hard disk drive in response to determining that a self-test of the hard disk drive has been successfully completed.

15. The method of claim 10, further comprising determining whether a self-test of the hard disk drive has been completed in response to a wake event.

16. The method of claim 10, further comprising storing diagnostic test results resulting from the self-test of the hard disk drive and facilitating access to the diagnostic test results during a customer support interaction.

17. A computer system, comprising:
a processor;
a basic input/output system;
a first memory space storing a self-test for a hard disk drive;
a second memory space storing a test schedule;
a third memory space storing a test completion date; and
means for automatically invoking the self-test of the hard disk drive in accordance with the test schedule when the test completion date is indicative of a successful completion of a prior self-test and to invoke the self-test of the hard disk drive without regard to the test schedule when the test completion date is not indicative of a successful completion of a prior self-test.

18. The system of claim 17, further comprising means for modifying the test schedule based on completion of the self-test.

19. The system of claim 17, further comprising means for automatically determining whether a self-test of the hard disk drive has been completed in response to a wake event.

20. The system of claim 17, further comprising means for storing diagnostic test results resulting from the self-test of the hard disk drive and facilitating access to the diagnostic test results during a customer support interaction.

\* \* \* \* \*